(12) United States Patent
Rotter et al.

(10) Patent No.: US 8,936,695 B2
(45) Date of Patent: Jan. 20, 2015

(54) METHOD FOR FORMING AND APPLYING COMPOSITE LAYUPS HAVING COMPLEX GEOMETRIES

(75) Inventors: Daniel M. Rotter, Forest Park, WA (US); Kurtis S. Willden, Kent, WA (US); William S. Hollensteiner, Kent, WA (US); Brian G. Robins, Renton, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 12/768,007

(22) Filed: Apr. 27, 2010

(65) Prior Publication Data

US 2011/0259515 A1 Oct. 27, 2011

(51) Int. Cl.
| | |
|---|---|
| *B32B 37/10* | (2006.01) |
| *B29C 70/38* | (2006.01) |
| *B29C 70/44* | (2006.01) |
| *B29C 70/54* | (2006.01) |
| *B29C 73/12* | (2006.01) |
| *B29C 73/32* | (2006.01) |
| *B29C 37/00* | (2006.01) |
| *B29L 31/30* | (2006.01) |

(52) U.S. Cl.
CPC ............. *B29C 70/382* (2013.01); *B29C 70/44* (2013.01); *B29C 70/541* (2013.01); *B29C 73/12* (2013.01); *B29C 73/32* (2013.01); *B29C 2037/903* (2013.01); *B29L 2031/3076* (2013.01); *B29L 2031/3082* (2013.01)
USPC ...... 156/285; 156/286; 100/269.02; 264/510; 264/511; 425/389

(58) Field of Classification Search
CPC .... B32B 37/10; B32B 37/1018; B29C 70/44; B29C 70/342; B29C 43/12; B29B 2043/3644
USPC .................. 156/285, 286, 381; 264/510, 511; 100/269.01; 425/389
See application file for complete search history.

(56) References Cited

U.S. PATENT DOCUMENTS

| | | | |
|---|---|---|---|
| 2,374,894 A | 5/1945 | Pioch et al. | |
| 2,679,278 A | 5/1954 | Clark | |

(Continued)

FOREIGN PATENT DOCUMENTS

| | | |
|---|---|---|
| DE | 102004046520 A1 | 4/2005 |
| EP | 0230682 A2 | 8/1987 |

(Continued)

OTHER PUBLICATIONS

Jayaweera et al. "Adaptive robotic assembly of compliant areo-structure components". Robotics and Computer-Intergrated Manufacturing, Elsevier Science Publishers, vol. 23, No. 2, Jan. 4, 2007, p. 180-194.*

(Continued)

*Primary Examiner* — Christopher Schatz
(74) *Attorney, Agent, or Firm* — Yee & Associates, P.C.

(57) ABSTRACT

A composite layup is formed on a tool and placed on a contoured part. The tool is contoured to substantially match the contour of the part. A set of location data is generated which represents the location of the part in space relative to the tool. An automated manipulator uses the location data to move the tool into proximity to the part and place the contoured layup on the part.

17 Claims, 7 Drawing Sheets

(56) References Cited

U.S. PATENT DOCUMENTS

| | | |
|---|---|---|
| 3,101,290 A | 8/1963 | Frederic et al. |
| 3,739,166 A | 6/1973 | Anderson |
| 3,967,996 A | 7/1976 | Kamov et al. |
| 3,983,282 A | 9/1976 | Seemann, III |
| 4,015,035 A | 3/1977 | Blad et al. |
| 4,016,022 A | 4/1977 | Browning et al. |
| 4,049,484 A | 9/1977 | Priest et al. |
| 4,120,632 A | 10/1978 | Stoeberl |
| 4,132,755 A | 1/1979 | Johnson |
| 4,208,238 A | 6/1980 | August et al. |
| 4,238,539 A | 12/1980 | Yates et al. |
| 4,287,015 A | 9/1981 | Danner, Jr. |
| 4,476,797 A | 10/1984 | Ivanov et al. |
| 4,491,081 A | 1/1985 | Ivanov |
| 4,491,493 A | 1/1985 | Eaton |
| 4,496,412 A | 1/1985 | Ritter |
| 4,548,859 A | 10/1985 | Kline et al. |
| 4,554,036 A | 11/1985 | Newsom |
| 4,564,543 A | 1/1986 | Ritter |
| 4,588,626 A | 5/1986 | Cologna et al. |
| 4,622,091 A | 11/1986 | Letterman |
| 4,698,115 A | 10/1987 | Dodds |
| 4,741,943 A | 5/1988 | Hunt |
| 4,824,513 A | 4/1989 | Dodds |
| 4,875,962 A * | 10/1989 | Breakspear ............... 156/245 |
| 4,902,215 A | 2/1990 | Seemann, III |
| 4,917,353 A | 4/1990 | Riley |
| 4,934,199 A | 6/1990 | Avila et al. |
| 4,942,013 A | 7/1990 | Palmer et al. |
| 4,945,488 A | 7/1990 | Carver et al. |
| 4,961,799 A | 10/1990 | Cologna et al. |
| 4,987,700 A | 1/1991 | Westerman et al. |
| 5,033,014 A | 7/1991 | Carver et al. |
| 5,034,254 A | 7/1991 | Cologna et al. |
| 5,052,906 A | 10/1991 | Seemann |
| 5,071,338 A | 12/1991 | Dublinski et al. |
| 5,087,193 A * | 2/1992 | Herbert, Jr. ............... 425/543 |
| 5,116,216 A | 5/1992 | Cochran et al. |
| 5,123,985 A | 6/1992 | Evans et al. |
| 5,129,813 A | 7/1992 | Shepherd |
| 5,167,742 A | 12/1992 | Peters |
| 5,180,046 A | 1/1993 | Hutton et al. |
| 5,190,611 A | 3/1993 | Cologna et al. |
| 5,207,541 A | 5/1993 | Westerman et al. |
| 5,217,669 A | 6/1993 | Dublinski et al. |
| 5,290,386 A | 3/1994 | Trudeau |
| 5,316,462 A | 5/1994 | Seemann |
| 5,350,614 A | 9/1994 | Chase et al. |
| 5,359,887 A | 11/1994 | Schwab et al. |
| 5,366,684 A | 11/1994 | Corneau, Jr. |
| 5,427,518 A * | 6/1995 | Morizot et al. ............... 425/504 |
| 5,427,725 A | 6/1995 | White et al. |
| 5,429,326 A | 7/1995 | Garesche et al. |
| 5,439,635 A | 8/1995 | Seemann |
| 5,441,692 A | 8/1995 | Taricco |
| 5,514,232 A | 5/1996 | Burns |
| 5,576,030 A | 11/1996 | Hooper |
| 5,601,852 A | 2/1997 | Seemann |
| 5,612,492 A | 3/1997 | Schwab et al. |
| 5,667,881 A | 9/1997 | Rasmussen et al. |
| 5,683,646 A | 11/1997 | Reiling, Jr. |
| 5,702,663 A | 12/1997 | Seemann |
| 5,721,034 A | 2/1998 | Seemann, III et al. |
| 5,759,325 A | 6/1998 | Davis |
| 5,780,721 A | 7/1998 | Levens |
| 5,820,894 A | 10/1998 | Kreutzer |
| 5,879,489 A | 3/1999 | Burns et al. |
| 5,882,756 A | 3/1999 | Alston et al. |
| 5,904,972 A | 5/1999 | Tunis, III et al. |
| 5,932,256 A | 8/1999 | Mandish |
| 5,939,013 A | 8/1999 | Han et al. |
| 5,954,898 A | 9/1999 | McKague et al. |
| 5,958,325 A | 9/1999 | Seemann, III et al. |
| 6,090,335 A | 7/2000 | McClure et al. |
| 6,096,164 A | 8/2000 | Benson et al. |
| 6,206,067 B1 | 3/2001 | Kociemba et al. |
| 6,211,497 B1 | 4/2001 | Matsen et al. |
| 6,284,089 B1 | 9/2001 | Anderson et al. |
| 6,298,896 B1 | 10/2001 | Sherrill et al. |
| 6,299,819 B1 | 10/2001 | Han |
| 6,355,203 B1 | 3/2002 | Charmes et al. |
| 6,391,246 B1 | 5/2002 | Shiraishi et al. |
| 6,391,436 B1 | 5/2002 | Xu et al. |
| 6,406,659 B1 | 6/2002 | Lang et al. |
| 6,408,517 B1 | 6/2002 | Lehmker et al. |
| 6,461,551 B1 | 10/2002 | Mandish |
| 6,510,977 B1 | 1/2003 | Hertz |
| 6,533,985 B1 | 3/2003 | Smith |
| 6,551,091 B1 | 4/2003 | Bryant et al. |
| 6,575,218 B1 | 6/2003 | Burns et al. |
| 6,579,418 B2 | 6/2003 | Lindsay et al. |
| 6,589,472 B1 | 7/2003 | Benson et al. |
| 6,638,466 B1 | 10/2003 | Abbott |
| 6,689,438 B2 | 2/2004 | Kennedy et al. |
| 6,692,681 B1 | 2/2004 | Lunde |
| 6,696,690 B2 | 2/2004 | Benne |
| 6,761,783 B2 | 7/2004 | Keller et al. |
| 6,797,390 B2 | 9/2004 | Asai et al. |
| 6,808,143 B2 | 10/2004 | Munk et al. |
| 6,830,079 B1 | 12/2004 | Ahrens et al. |
| 6,860,957 B2 | 3/2005 | Sana et al. |
| 6,919,039 B2 | 7/2005 | Lang et al. |
| 7,029,267 B2 | 4/2006 | Caron |
| 7,127,950 B2 | 10/2006 | Fonov et al. |
| 7,137,182 B2 | 11/2006 | Nelson |
| 7,141,191 B2 | 11/2006 | Engwall et al. |
| 7,186,367 B2 | 3/2007 | Hou et al. |
| 7,228,611 B2 | 6/2007 | Anderson et al. |
| 7,294,220 B2 | 11/2007 | Anderson |
| 7,306,450 B2 | 12/2007 | Hanson |
| 7,398,586 B2 | 7/2008 | Prichard et al. |
| 7,398,698 B2 | 7/2008 | Griess et al. |
| 7,413,694 B2 | 8/2008 | Waldrop, III et al. |
| 7,503,368 B2 | 3/2009 | Chapman et al. |
| 7,521,105 B2 | 4/2009 | Bech et al. |
| 7,527,759 B2 | 5/2009 | Lee et al. |
| 7,534,615 B2 | 5/2009 | Havens et al. |
| 7,622,066 B2 | 11/2009 | Brustad et al. |
| 7,624,488 B2 | 12/2009 | Lum et al. |
| 7,628,879 B2 | 12/2009 | Ackerman |
| 7,655,168 B2 | 2/2010 | Jones et al. |
| 7,762,122 B2 | 7/2010 | Advani et al. |
| 7,849,729 B2 | 12/2010 | Miller et al. |
| 7,871,040 B2 | 1/2011 | Lee et al. |
| 7,963,038 B2 | 6/2011 | Schmitz |
| 7,964,049 B2 | 6/2011 | Kapur et al. |
| 8,003,034 B2 | 8/2011 | Oldani et al. |
| 8,114,673 B2 | 2/2012 | Mills et al. |
| 8,409,396 B2 | 4/2013 | Bech et al. |
| 2002/0060018 A1 | 5/2002 | Lindsay et al. |
| 2003/0082321 A1 | 5/2003 | Kennedy et al. |
| 2003/0175511 A1 | 9/2003 | Asai et al. |
| 2004/0026025 A1 | 2/2004 | Sana et al. |
| 2004/0031567 A1 | 2/2004 | Engelbart et al. |
| 2004/0258562 A1 | 12/2004 | Mills et al. |
| 2005/0086916 A1 | 4/2005 | Caron |
| 2005/0102814 A1 | 5/2005 | Anderson et al. |
| 2005/0112772 A1 | 5/2005 | Farone et al. |
| 2005/0161154 A1 | 7/2005 | Anderson |
| 2005/0230055 A1 | 10/2005 | Sana et al. |
| 2005/0236735 A1 | 10/2005 | Oldani et al. |
| 2005/0253309 A1 | 11/2005 | Hou et al. |
| 2006/0108058 A1 | 5/2006 | Chapman et al. |
| 2006/0118235 A1 | 6/2006 | Lum et al. |
| 2006/0121613 A1 | 6/2006 | Havens |
| 2007/0029527 A1 | 2/2007 | Mills et al. |
| 2007/0107189 A1 | 5/2007 | Prichard et al. |
| 2007/0272582 A1 | 11/2007 | Lau |
| 2007/0289246 A1 | 12/2007 | Schmitz |
| 2008/0023015 A1 | 1/2008 | Arnold et al. |
| 2008/0111024 A1 | 5/2008 | Lee et al. |
| 2008/0148817 A1 | 6/2008 | Miller et al. |
| 2008/0178996 A1 * | 7/2008 | Tada et al. ............... 156/285 |
| 2008/0308674 A1 | 12/2008 | Frantz et al. |

(56) References Cited

U.S. PATENT DOCUMENTS

| | | | |
|---|---|---|---|
| 2009/0120562 | A1 | 5/2009 | Tsotsis et al. |
| 2009/0145545 | A1 | 6/2009 | Brennan et al. |
| 2009/0148647 | A1 | 6/2009 | Jones et al. |
| 2009/0211698 | A1 | 8/2009 | McCowin |
| 2009/0273107 | A1 | 11/2009 | Advani et al. |
| 2009/0320292 | A1 | 12/2009 | Brennan et al. |
| 2010/0011580 | A1 | 1/2010 | Brennan et al. |
| 2010/0012260 | A1 | 1/2010 | Brennan et al. |
| 2010/0078126 | A1 | 4/2010 | Brennan et al. |
| 2010/0170326 | A1 | 7/2010 | Miller et al. |
| 2011/0079174 | A1 | 4/2011 | Miller et al. |
| 2011/0259086 | A1 | 10/2011 | Harris et al. |
| 2013/0011586 | A1 | 1/2013 | Landry et al. |

FOREIGN PATENT DOCUMENTS

| | | | |
|---|---|---|---|
| EP | 0271263 | A2 | 6/1988 |
| EP | 0319449 | A2 | 6/1989 |
| EP | 0348831 | A2 | 1/1990 |
| EP | 0391641 | A2 | 10/1990 |
| EP | 0391641 | B1 | 8/1994 |
| EP | 0629497 | A2 | 12/1994 |
| EP | 0816438 | A2 | 1/1998 |
| EP | 1038656 | A1 | 9/2000 |
| EP | 1780120 | A2 | 5/2007 |
| EP | 1995044 | A2 | 11/2008 |
| EP | 1995045 | A2 | 11/2008 |
| EP | 2067611 | A1 | 6/2009 |
| EP | 2383106 | A1 | 2/2011 |
| EP | 2383559 | A1 | 4/2011 |
| EP | 2444240 | A1 | 4/2012 |
| GB | 2478848 | A | 9/2011 |
| JP | 60252235 | A | 12/1985 |
| JP | 62259059 | A | 11/1987 |
| JP | H06242087 | A | 9/1994 |
| JP | 2002254429 | A | 9/2002 |
| JP | 2004309379 | A | 11/2004 |
| KR | 19970058260 | | 11/1997 |
| WO | 9322127 | A1 | 11/1993 |
| WO | 0176892 | A1 | 10/2001 |
| WO | 02099416 | A1 | 12/2002 |
| WO | 03021252 | A1 | 3/2003 |
| WO | 2004031321 | A1 | 4/2004 |
| WO | WO2004057120 | A2 | 7/2004 |
| WO | 2005056391 | A2 | 6/2005 |
| WO | 2005059500 | A1 | 6/2005 |
| WO | 2006110627 | A1 | 10/2006 |
| WO | 2006118692 | A1 | 11/2006 |
| WO | 2008054499 | A2 | 5/2008 |
| WO | 2008088435 | A1 | 7/2008 |
| WO | 2010025376 | A1 | 3/2010 |

OTHER PUBLICATIONS

PCT search report dated Dec. 22, 2006 regarding Application PCT/US2007/023455, applicant The Boeing Company, (13 Pages).
EP search report dated Sep. 26, 2011 regarding Application 11160866.7-2307, applicant The Boeing Company, (11 Pages).
Campbell, "Manufacturing processes for advanced composites, Ply Collation: A Major Cost Driver", Manufacturing Processes for Advanced Composites, Elsevier Advanced Technology, XP002535222, Jan. 2004, pp. 130-173.
USPTO non-final office action dated Jul. 27, 2010 regarding U.S. Appl. No. 12/242,477, 14 Pages.
USPTO final office action dated Dec. 2, 2011 regarding U.S. Appl. No. 12/242,477, 15 Pages.
USPTO non-final office action dated Mar. 10, 2010 regarding U.S. Appl. No. 11/829,900, 13 Pages.
USPTO notice of allowance dated Jul. 30, 2010 regarding U.S. Appl. No. 11/829,900, 8 Pages.
Final Office Action, dated Jul. 29, 2013, regarding U.S. Appl. No. 12/200,882, 10 pages.
Final Office Action, dated Aug. 15, 2013, regarding U.S. Appl. No. 12/764,202, 16 pages.
Material Safety Data Sheet for Potassium indigotetrasulfonate, Sigma-Aldric Corporation, Dec. 13, 2012, 6 pages.
Notice of Allowance, dated Dec. 6, 2013, regarding U.S. Appl. No. 12/764,202, 20 pages.
Final Office Action dated Jan. 17, 2014, regarding U.S. Appl. No. 11/952,222, 37 pages.
European Search Report dated Dec. 2, 2013 regarding Application No. EP09792061.5-1753, 6 pages.
Buckingham et al., "Automating the manufacture of composite broadgoods," Composites, vol. 27A, No. 3, pp. 191-200, Mar. 1996.
Jayaweera et al., "Adaptive robotic assembly of compliant aero-structure components," Robotics and Computer-Integrated Manufacturing, vol. 23, No. 2, pp. 180-194, Jan. 2007.
Sieberg et al., "Eine fortschrittliche GFK—Fertigungstechnik setze sich durch: Praxiserfahrungen mit dem Vakuum-Injektions-Verfahren," Studiedag Vakuuminjecteren, XP002169062, Oct. 27, 1998, pp. 13-19. (German-language article not available in English).
International Search Report dated Mar. 2, 2009 regarding Application No. EP08171011 (EP2067611), 2 pages.
International Search Report dated Feb. 1, 2010 regarding Application No. PCT/US2009/055378 (WO2010025376), 3 pages.
International Search Report dated Jul. 15, 2011 regarding Application No. GB1104472.4 (GB2478848), 5 pages.
International Search Report dated Mar. 2, 2012 regarding Application No. EP12151305 (EP2444240), 2 pages.
Korean Intellectual Property Office Notice of Office Action dated Jun. 11, 2010, regarding Application No. 200847564, 9 pages.
Korean Intellectual Property Office Notice of Office Action dated Jun. 21, 2010, regarding Application No. 200847566, 14 pages.
USPTO Office Action dated Apr. 13, 2011 regarding U.S. Appl. No. 11/751,928, 19 pages.
USPTO Final Office Action dated Jun. 23, 2011 regarding U.S. Appl. No. 11/751,928, 11 pages.
USPTO Office Action dated Jan. 19, 2012 regarding U.S. Appl. No. 11/751,928, 13 pages.
USPTO Office Action dated Feb. 21, 2012 regarding U.S. Appl. No. 12/906,489, 15 pages.
USPTO Office Action dated Jun. 2, 2010 regarding U.S. Appl. No. 11/751,931, 15 pages.
USPTO Final Office Action dated Aug. 11, 2010 regarding U.S. Appl. No. 11/751,931, 29 pages.
USPTO Office Action dated May 20, 2011 regarding U.S. Appl. No. 11/751,931, 31 pages.
USPTO Final Office Action dated Sep. 28, 2011 regarding U.S. Appl. No. 11/751,931, 24 pages.
USPTO Office Action dated Oct. 26, 2010 regarding U.S. Appl. No. 11/952,222, 20 pages.
USPTO Final Office Action dated Apr. 15, 2011 regarding U.S. Appl. No. 11/952,222, 20 pages.
USPTO Office Action dated Oct. 3, 2011 regarding U.S. Appl. No. 11/952,222, 21 pages.
USPTO Final Office Action dated Apr. 30, 2012 regarding U.S. Appl. No. 11/952,222, 25 pages.
USPTO Office Action dated May 17, 2010 regarding U.S. Appl. No. 12/200,882, 9 pages.
USPTO Final Office Action dated Oct. 26, 2010 regarding U.S. Appl. No. 12/200,882, 8 pages.
Miller et al., "Leak Detection in Vacuum Bags," U.S. Appl. No. 13/892,916, filed May 13, 2013, 48 pages.
Notice of Allowance, dated May 10, 2013, regarding U.S. Appl. No. 11/751,931, 49 pages.
Office Action, dated May 9, 2013, regarding U.S. Appl. No. 11/952,222, 27 pages.
Office Action dated Mar. 21, 2013, regarding U.S. Appl. No. 12/200,882, 47 pages.
Office Action, dated Mar. 26, 2013, regarding U.S. Appl. No. 13/657,137, 41 pages.
Office Action, dated Apr. 1, 2013, regarding U.S. Appl. No. 12/764,202, 38 pages.
El Amin, "Nano ink indicates safety breach in food packaging," http://www.foodproductiondaily.com/Quality-Safety/Nano-ink-indicates-safety-breach-in-food-packaging, Nov. 14, 2006, 2 pages.

(56) References Cited

OTHER PUBLICATIONS

European Search Report, dated Sep. 30, 2011, regarding Application No. EP11160843 (EP2383559), 7 pages.

Lee et al., "Novel UV-Activated Colorimetric Oxygen Indicator," Chemistry of Materials, vol. 17, No. 10, May 2005, pp. 2744-2751. (Abstract).

Mills et al., "UV-Activated Luminescence/Colourimetric O2 Indicator," International Journal of Photoenergy, vol. 2008, 2008, 6 pages.

Setnescu et al., "Polymer Films Doped with Colorants as Oxygen Sensitive Materials," Journal of Optoelectrics and Advanced Materials, vol. 8, No. 2, Apr. 2006, pp. 682-686.

USPTO Final Office Action, dated Jun. 20, 2012, regarding U.S. Appl. No. 11/751,928, 20 pages.

USPTO Notice of Allowance, dated Jun. 13, 2012, regarding U.S. Appl. No. 12/906,489, 9 pages.

USPTO Office Action, dated Apr. 26, 2012, regarding U.S. Appl. No. 12/764,202, 13 pages.

USPTO Notice of Allowance, dated Jul. 5, 2012, regarding U.S. Appl. No. 12/242,477, 9 pages.

Notice of Allowance, dated Sep. 21, 2012, regarding U.S. Appl. No. 12/725,380, 19 pages.

Notice of Allowance, dated Sep. 14, 2012, regarding U.S. Appl. No. 12/906,489, 34 pages.

Office Action, dated Oct. 24, 2012, regarding U.S. Appl. No. 11/952,222, 39 pages.

Final Office Action, dated Nov. 16, 2012, regarding U.S. Appl. No. 12/764,202, 31 pages.

Brennan et al., "Compaction of Prepreg Plies on Composite Laminate Structures," U.S. Appl. No. 13/657,137 and Preliminary Amendment, filed Oct. 22, 2012, 37 pages.

Lee et al., "Novel UV-Activated Colorimetric Oxygen Indicator," Chemistry of Materials, vol. 17, No. 10, May 2005, pp. 2744-2751.

Notice of Allowance dated Jul. 17, 2014, regarding U.S. Appl. No. 11/952,222, 15 pages.

* cited by examiner

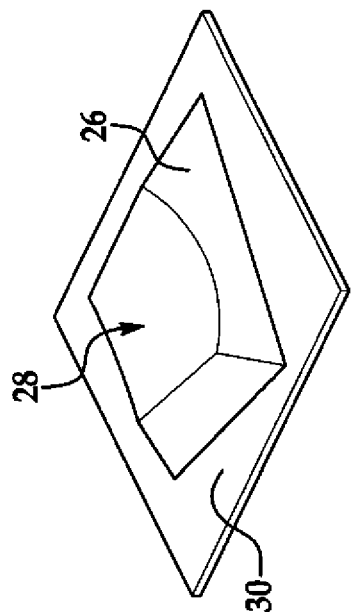
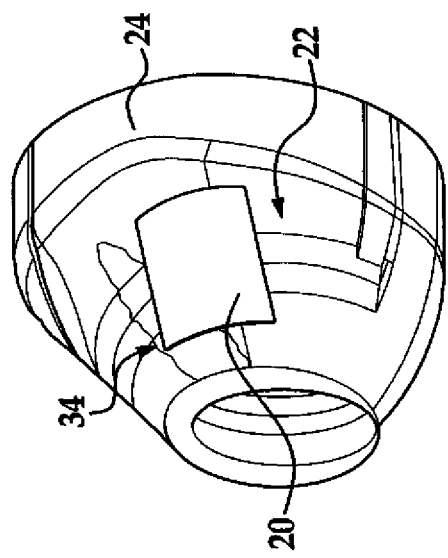
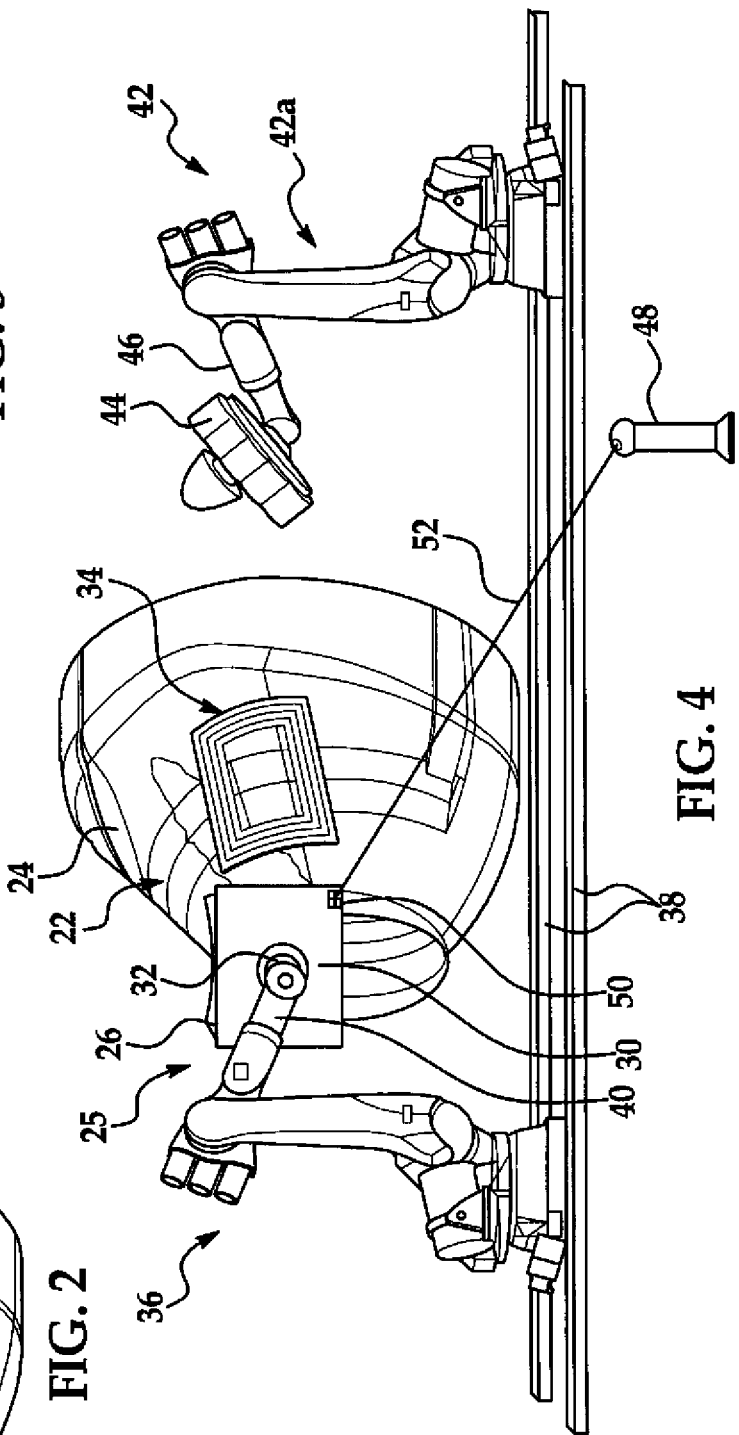

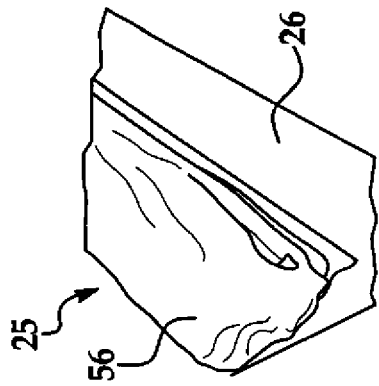
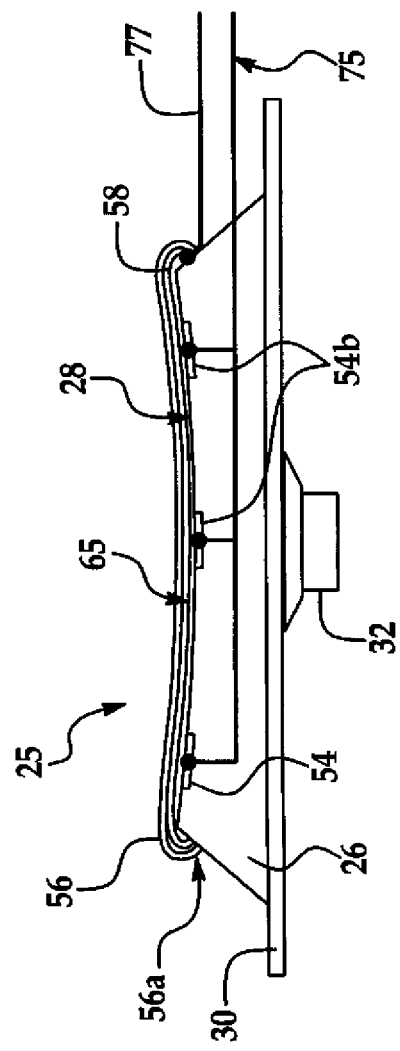
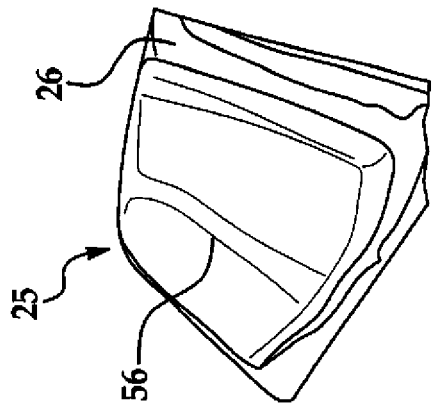
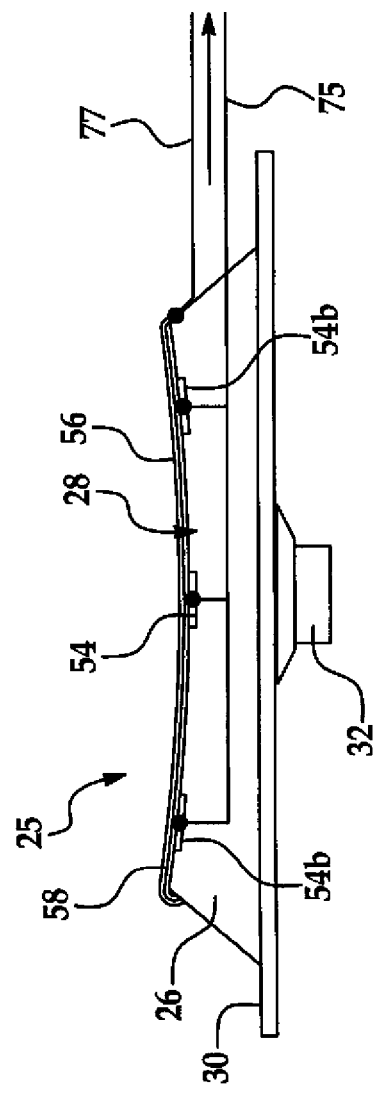

METHOD FOR FORMING AND APPLYING COMPOSITE LAYUPS HAVING COMPLEX GEOMETRIES

CROSS REFERENCE TO RELATED APPLICATIONS

This application is related to co-pending U.S. patent application Ser. No. 11/829,900 filed Jul. 28, 2007, and Ser. No. 12/242,477 filed Sep. 30, 2008, which applications are incorporated by reference herein in their entireties.

TECHNICAL FIELD

This disclosure generally relates to fabrication of composite parts, and deals more particularly with a method and apparatus for forming and applying composite layups such as doublers, to part surfaces having complex geometries.

BACKGROUND

Automated fiber placement (AFP) machines may be used to layup composite laminate structures comprising multiple plies of one or more fiber orientations. Where the entire structure is fabricated using an AFP machine, the build rate may be dependant upon the speed of the AFP machine, since the plies are normally formed sequentially. In order to accelerate the build process, certain segments of the structure may be built by hand and applied to the structure as preassembled kits. For example, doublers may be preassembled and applied by hand as a subtask during the AFP build sequence. However, preassembling doubler layups by hand can be time consuming and difficult, particularly where the doublers must be applied to a structure having surface complex geometries, such as a multi-contoured nose or tail section of an airplane. Prior attempts to preassemble doublers using automated equipment have been limited to layups that are either flat or which have a constant curvature in one dimension.

Accordingly, there is a need for a method and apparatus for forming and applying layups such as doublers to composite structures having complex surface geometries which include multiple contours.

SUMMARY

The disclosed embodiments provide a method and apparatus for forming and applying layups on composite structures having complex shapes, such as multi-contoured parts. Layup, application and compaction requirements are integrated into a process that may use a single tool. The layups may be quickly formed to match the geometry of the part surface using an AFP machine to layup composite material on a tool having a multi-contoured tool face substantially matching the part surface. The tool may also be used to place and compact the layup on the part surface. The disclosed method and apparatus allows layups such as doublers to be fabricated off a main assembly line, thus permitting them to be reworked as necessary and inspected without slowing down the main assembly process.

According to one disclosed embodiment, a method is provided of forming and placing a composite layup on a contoured part. The method includes forming a contoured composite layup on a tool contoured to substantially match the contour of the part. The method also includes generating a set of location data representing the location of the part relative to the tool. The method uses a manipulator and the location data to move the tool into proximity to the part and place the contoured layup on the part. Forming the contoured composite layup may be performed using an automatic fiber placement machine to automatically place composite material on the tool. The layup may be compacted against the part by inflating a bladder on the tool and/or by inflating a bag on the tool. The bag may be separated away from the compacted layup by deflating the bag. Generating the location data may be performed by determining the three-dimensional (3-D) position of the tool contour relative to the 3-D position of the part contour in a common 3-D reference system.

According to another embodiment, a method is provided of applying composite doublers on a part having a multi-contoured surface. The method includes drawing a vacuum bag down onto a multi-contoured face of a tool substantially matching the contours of the part surface. Composite plies are laid up on the tool face over the bag. The method includes generating a set of location data representing the location of the tool face relative to the surface of the part. The method further comprises using the location data and a manipulator to automatically move the tool into proximity to the part and place the layup against the part surface. The method also includes compacting the layup against the part surface by inflating the bag. Drawing the bag down onto the tool face is performed by drawing a vacuum in the bag.

According to still another embodiment, a method is provided of applying a layup on a part having a multi-contoured surface. The method includes drawing a flexible bag down onto a multi-contoured face of a tool substantially matching the contours of the parts surface. The method includes placing a composite layup on the bag-covered tool face and moving the tool into proximity to the part and using the tool to place the layup on the parts surface. The method also includes compacting the layup against the parts surface by inflating the bag and separating the bag from the compacted layup by drawing a vacuum in the bag. The method may further comprise compacting the layup against the parts surface by inflating a bladder between the tool face and the bag.

According to still another embodiment, apparatus is provided for applying composite layups on a contoured substrate. The apparatus includes a tool, first and second compactors, and means for controlling the first and second compactors. The tool is adapted to be mounted on a manipulator for moving the tool into proximity to the substrate and includes a contoured tool face substantially matching the contour of the substrate. The first flexible compactor covers the tool face and is adapted to have a composite layup placed thereon. The second flexible compactor is disposed between the first compactor and the tool face for compacting the layup onto the substrate. The first compactor may include a vacuum bag sealed to the tool, and the second compactor may include a flexible, inflatable Bladder. The means for controlling the first and second compactors may include a pressure source, a vacuum source, and a controller for selectively pressurizing and depressurizing the first and second compactors using the pressure source and the vacuum source.

In accordance with another embodiment, apparatus is provided for forming and applying composite layups on a part having a multi-contoured surface. The apparatus includes a tool having a multi-contoured face substantially matching the contours of the part surface, a flexible bag on the tool, a manipulator, and a controller. The flexible bag covers and conforms to the contours of the tool face and is adapted to have a layup placed thereon and pressurized to compact the layup against the part surface. The manipulator manipulates the tool into proximity to the part and places the layup on the part surface. The controller controls the operation of the manipulator and pressurization of the bag. The apparatus may further comprise an inflatable bladder between the tool face and the bag for compacting the layup against the part surface. In one embodiment, the tool is formed of structural foam.

According to still another embodiment, apparatus is provided for forming and applying composite layups on a part having a multi-contoured surface. The apparatus includes a tool, a robotic manipulator, an automatic composite fiber placement machine, a locator system, a compactor, and control means. The tool includes a multi-contoured face substantially matching the contours of the part surface. The robotic manipulator has the tool mounted thereon for manipulating the tool. The automatic composite fiber placement machine includes a fiber placement head for forming a multi-ply composite layup on the tool face. The locator system generates a set of location data that locates the fiber placement head, the tool face and the part surface relative to each other in a common spatial reference system. The compactor on the tool compacts the layup against the part surface, and the control means controls the operation of the manipulator, the automatic fiber placement machine and the compactor, based on the location data.

BRIEF DESCRIPTION OF THE ILLUSTRATIONS

FIG. 2 is an illustration of a perspective view of a multi-contoured nose section for an airplane having a composite doubler applied and compacted thereon in accordance with the disclosed embodiments.

FIG. 3 is an illustration of an isometric view of a tool used to form and apply the doubler shown in FIG. 2, a compaction bag and bladder not shown for clarity.

FIG. 4 is an illustration of a side view of apparatus for forming and applying composite layups having complex geometries to the nose section shown in FIG. 2.

FIG. 6A is a sectional view of the tool when initially assembled.

FIG. 6B is an illustration of a perspective view of the tool shown in FIG. 6A.

FIG. 7A is an illustration similar to FIG. 6A but showing the bag having been drawn down against the tool surface.

FIG. 7B is an illustration similar to FIG. 6B but showing the bag having been drawn down against the tool surface.

DETAILED DESCRIPTION

Figure 1:
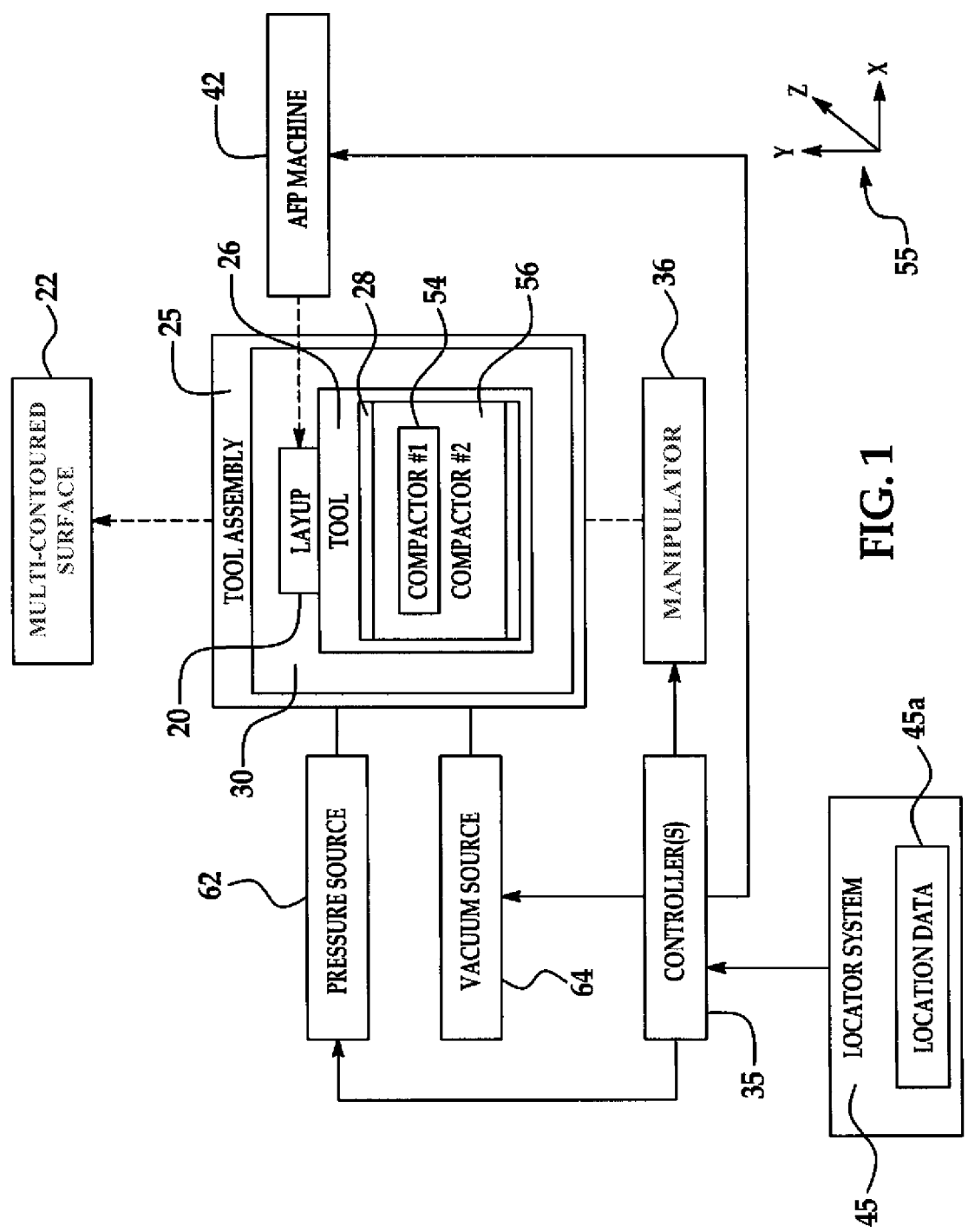
FIG. 1 is an illustration of a functional block diagram of apparatus for forming and applying composite layups having complex geometries.

Referring first to FIGS. 1-3, the disclosed embodiments relate to a method and apparatus for forming and placing a composite layup 20 on a substrate having a complex geometry, which may comprise a multi-contoured surface 22 of the part 24 as shown in FIG. 2. In the illustrated embodiment, the part 24 comprises the nose section of an airplane, and the layup 20 comprises a doubler that reinforces an area 34 of the nose section. The apparatus includes a tool assembly 25 mounted on a suitable manipulator 36 that is operated by one or more controllers 35. The manipulator 36 may comprise a robot or similar automated device that moves the tool assembly 25 along multiple axes in a reference system 55 based on set of programmed instructions used by the controller 35.

The tool assembly 25 includes a tool 26 having a multi-contoured tool face 28 that substantially matches the multi-contoured part surface 22 in the area 34 where the layup 20 is to be applied to the part 24. The tool assembly 25 also includes first and second compactors 54, respectively for compacting the layup 20 against the part surface 22. The tool assembly 25 further includes a tool base 30 upon which the tool 26 is mounted. Each of the compactors 54, 56 respectively, is inflated and deflated respectively using a pressure source 62 and a vacuum source 64 operated by the controller(s) 35.

The layup 20 may be formed on the multi-contoured tool face 28 by an automatic fiber placement machine (AFP) which may also operated by the controller(s) 35. A locator system 45 generates a set of location data 45a that locates the position and orientation of the tool face 28 relative to the part surface 22 in the three dimensional special reference system 55. Similarly, the locator system may be used by the controller 35 to locate and coordinate the movement of the AFP machine 42 relative to the tool face 28.

Figure 5:
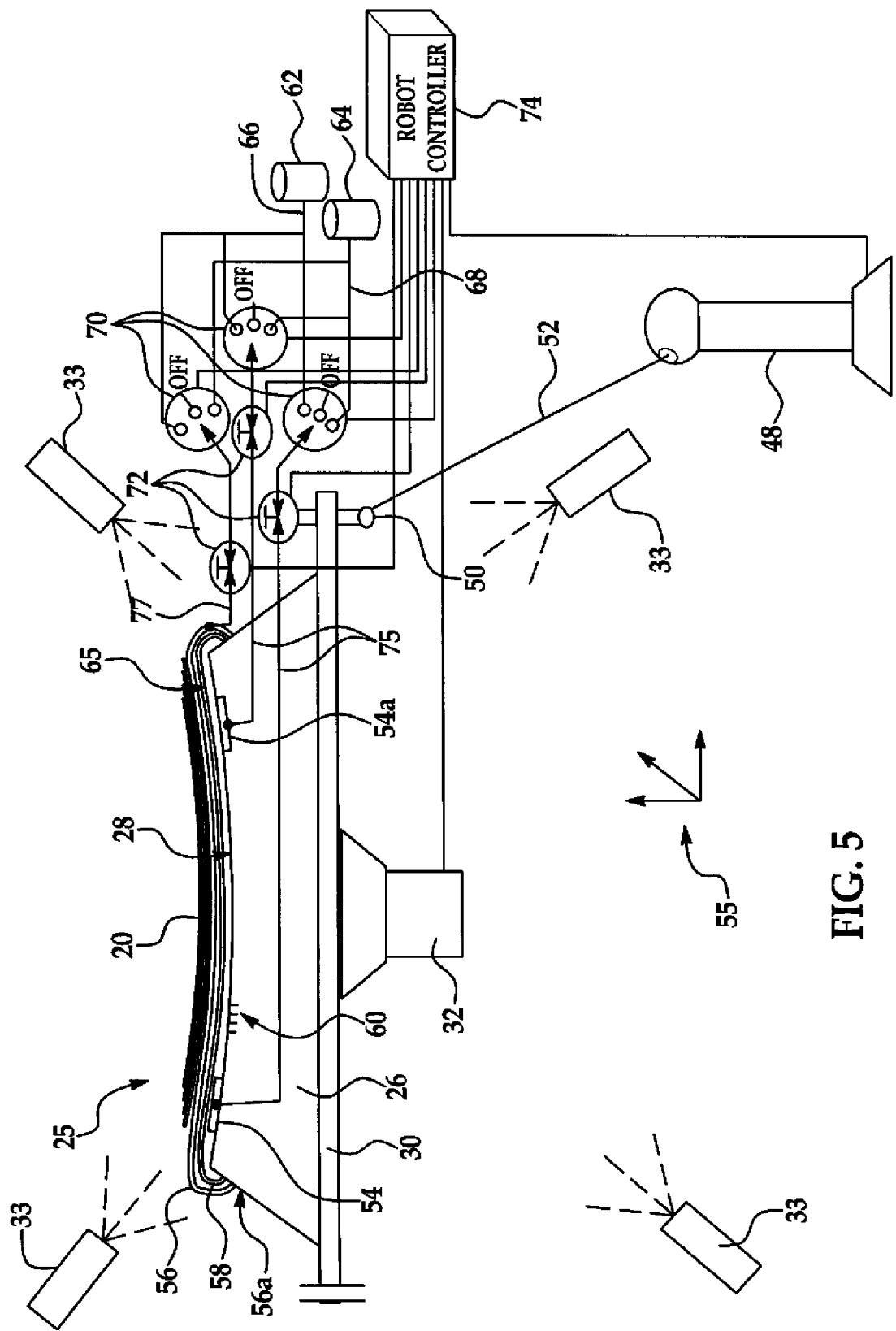
FIG. 5 is an illustration of a combined sectional and diagrammatic view of the tool and locator system.

Attention is now directed to FIGS. 4 and 5 which illustrate additional details of the apparatus. In this embodiment, the manipulator 36 comprises a robot 36 mounted for linear movement along a pair of rails 38. The robot 36 includes a robot arm 40 having the tool assembly 25 mounted on the end thereof by means of a quick-change adapter 32 (FIG. 5). The quick-change adapter 32 allows differently configured tools 26 to be quickly mounted on the arm 40 in order to place differently configured layups 20 on different areas of the part 24 that have differing geometries. As previously mentioned, the robot 36 is operated by one or more programmed controllers 35 (FIG. 1) and is capable of displacing the tool assembly 25 along multiple axes within spatial reference system 55 (FIG. 5). The robot 36 manipulates the tool assembly 25 to place a doubler or other layup 20 in a targeted area 34 on the multi-contoured surface 22 of the part 24.

The AFP machine 42 may comprise a second robotic device 42a mounted for linear movement along the rails 38 and includes an automatic fiber placement head 44 mounted on the end of a robotic arm 46. As will be discussed below, the head 44 lays down multiple strips or courses of composite fiber tape or tows on the tool face 28 to form a multi-contoured layup 20 which is then placed and compacted onto the multi-contoured surface 22 of the part by the tool assembly 25 positioned by the manipulator 36. In an alternate embodiment, the layups 20 may be kitted and delivered to the robot on a conveyor (not shown) or carousel (not shown).

The locator system 45 (FIG. 1) monitors and updates the position of the tool 26, and thus the tool face 28 (FIG. 1), relative to the part 24, and specifically the part surface 22. The use of the locator system 45 allows the tool assembly 25 and the robot 36 to be mobile, rather than being mounted in fixed positions. This mobility may improve placement accuracy while contributing to a lean manufacturing process. As previously mentioned, the locator system 45 (FIG. 1) generates a set of location data 45*a* (FIG. 1) in order to coordinate the movements of the AFP machine 42, the tool assembly 25 and the part 24 within the common spatial reference system 55 (FIG. 5). The location data 45*a* may be constantly updated and used in a closed feedback loop by the controller(s) 35 to achieve placement accuracy of the layup 20 on the part surface 22.

The locator system 45 may comprise one or more laser trackers 48 which develops position data by directing a laser beam 52 onto reflective targets 50 placed on the tool assembly 25 and the part 24. The locator system 45 may optionally further include photogrammetry cameras 33 which record the location of laser beam light reflected off of the reflectors 50 in order to measure the position of the tool assembly 25 relative to the multi-contoured surface 22 in the spatial coordinate system 55. The photogrammetry cameras 33 may comprise, for example and without limitation, commercially available cameras such as commercially available V-Star cameras. Using a combination of photogrammetry and laser tracker measurements of multiple targets 50, a determination may be made of the position of the tool face 28 relative to the multi-contoured surface 22 in the common spatial reference system 55. The photogrammetry and laser tracking measurements of the locations of the targets 50 may be integrated together utilizing one or more computers and software programs which may comprise a part of the controllers 35. The locator system 45 including the reflective targets 50 may be similar to that disclosed in U.S. Pat. No. 7,587,258 issued Sep. 8, 2009 which is incorporated by reference herein in its entirety.

Referring now particularly to FIG. 5, the tool 26 may comprise, for example and without limitation, a light-weight structural foam in which the tool face 28 may be formed by any of several well-known fabrication techniques such as, without limitation, machining and molding. The tool 26 may be fabricated from other low cost materials using low cost fabrication methods to reduce the cost of the tool 26. The first compactor 54 (FIG. 1) may comprise an inflatable bladder 54 which may be positioned on the tool face 28 or recessed slightly within the tool face 28, as shown at 54*a*. The second compactor 56 (FIG. 1) may comprise a flexible vacuum bag 56 which is sealed around its periphery 56*a* to the tool 26, thereby forming a pressurizable, substantially vacuum tight chamber 65 over the tool face 28. A breather 58 may be provided between the tool face 28 and the bag 56 to allow air movement under the bag 56 during evacuation. The bag 56 and the breather 58 both cover the tool face 28 thereby protecting the tool face 28 from damage, and facilitating removal of the layup 20 from the tool 26. The bag 56 may have a surface texture that allows composite layup pre-preg to adhere to its surface during the layup process without distortion, yet is sufficiently elastic to inflate, compact and release the layup 20 onto the part surface 22. The bag 56 may be formed from, for example and without limitation, latex film, poly packaging film, or urethanes having textured or non-textured surfaces.

In the embodiments illustrated in FIGS. 5, 6A, 7A, 8A, 9A and 10, the bladder 54 is illustrated as a series of generally parallel, separate but interconnected bladders 54*b* that operate as a single bladder. However in other embodiments, the bladder 54 may comprise a single bladder extending over substantially the entire tool face 28. The bladder 54 may be shaped, sized and have its inflation sequenced to optimize compaction against the multi-contoured surface 22. The bladder 54 and the bag 56 are each connected through a series of flow control valves 72 and three way control valves 70 to a pressure source 62 and a vacuum source 64. The control valves 70 are operated by the controller 74 which may be the same or different from the previously discussed controller(s) 35 (FIG. 1), and function to selectively couple either the pressure source 62 or the vacuum source 64 to the bladder 54 and the bag 56. Thus, the automatically operated control valves 70 may couple either or both the bladder 54 and the bag 56 with the pressure source 62 in order to pressurize and thereby inflate either the bladder 54 or the bag 56. Similarly, the control valves 70 may couple the vacuum source 64 to either the bladder 54 or the bag 56 in order to deflate the bladder 54, or evacuate the bag 56 which draws the bag 56 down onto the tool face 28. In some embodiments, the tool face 28 may be provided with vacuum grooves 60 that may also be coupled with the control valves 70 in order to assist in pressurizing/depressurizing the chamber 65.

FIGS. 6-11 illustrate use of the tool assembly 25 and sequential steps used to form a multi-contoured layup 20, and then place and compact it onto the multi-contoured surface 22. Referring initially to FIGS. 6A and 6E, after securing the tool 26 on the tool base 30, the bag 56 and breather 58 are installed over the tool face 28, and the perimeter 56*a* of the bag 56 is sealed to the tool 26, forming a substantially vacuum tight, pressurizable chamber 65 (FIGS. 5 and 6) between the bag 56 and the tool 26. Vacuum lines 68 and pressure lines 66 (FIG. 5) are then installed and connected with both the bladder 54 and the bag 56. At this point, neither line 75 nor line 77 is connected to either the pressure source 62 or the vacuum source 64 through control valves 70 (FIG. 5), but rather are open to the atmosphere, consequently the bladder 54 and the chamber 65 are substantially at atmospheric pressure.

Referring now to FIGS. 7A and 7B, the tool assembly 25 is readied by connecting the vacuum source 64 to both lines 75 and 77 using control valves 70, which results in substantially full deflation of the bladder 54 and evacuation of air from the chamber 65. Evacuation of air from the chamber 65 causes the bag 56 to be drawn down onto the tool surface 28 so that the bag 56 conforms substantially to the multiple contours of the tool face 28.

Figure 8B:
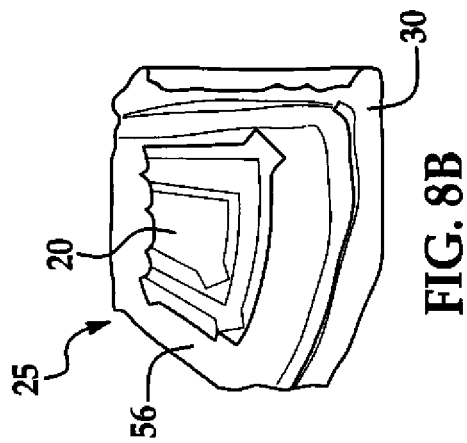
FIG. 8B is an illustration of a perspective view of the tool, showing a layup having been partially formed on the tool face.
Figure 8A:
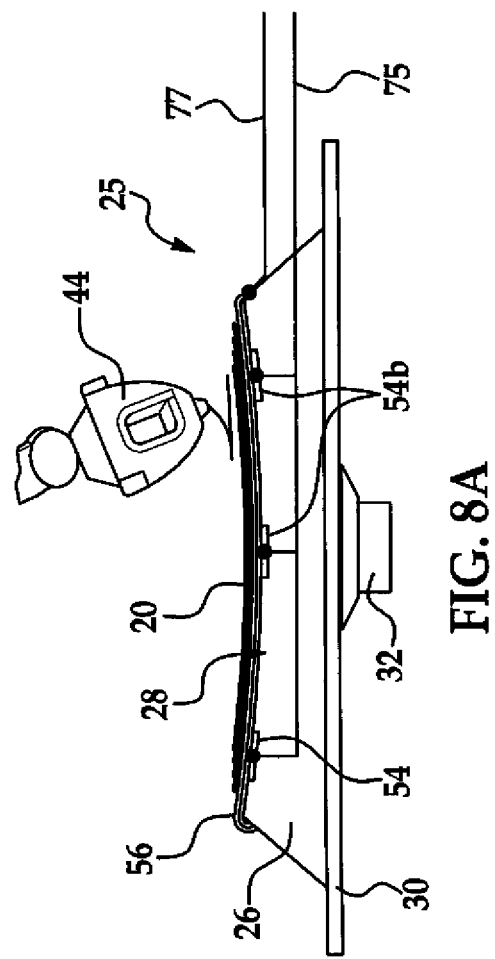
FIG. 8A is an illustration of a sectional view of the tool showing an automatic fiber placement head forming a layup on the tool face.

Referring to FIGS. 8A and 8B, with the bag 56 drawn down onto the tool face 28, the fiber placement head 44 may commence laying down composite fiber material onto the bag according to a prescribed ply schedule. The plies conform to the contours of the tool face 28 as they are being formed by the AFP machine 42, consequently the layup 20 possesses contours substantially matching those of the part surface 22. Lines 75 and 77 remain coupled with the vacuum source 64 as the layup 20 is being formed on the tool face 28.

Figure 9B:
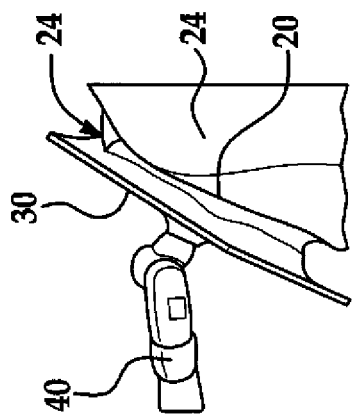
FIG. 9B is an illustration of a perspective view showing the tool placing the layup on the part surface.
Figure 9A:
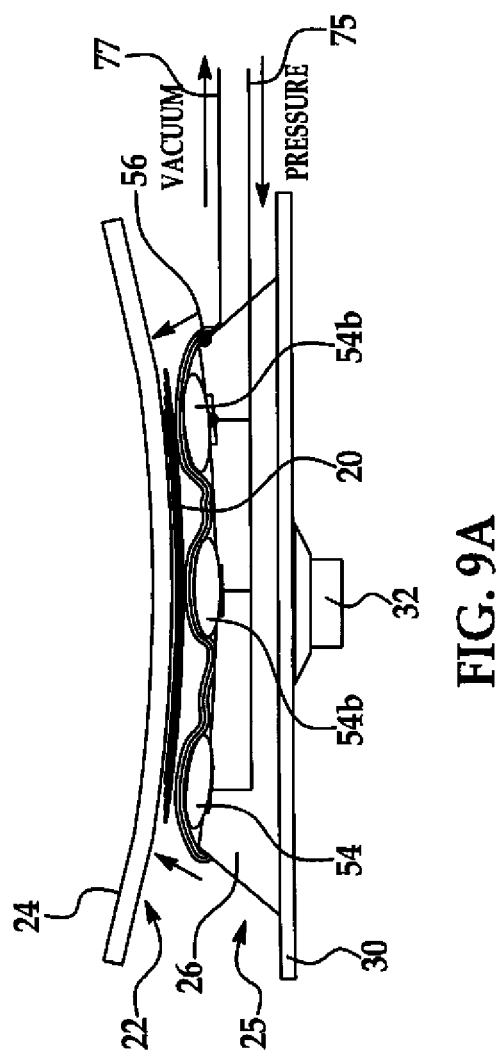
FIG. 9A is an illustration of a sectional view of the tool showing the layup having been placed on the part surface, and the tool bladder having been inflated to compact the layup against the part surface.

Referring to FIGS. 9A and 9B, after the layup 20 has been formed on the tool 26, the robot 36 moves the tool assembly 25 into proximity with the part 24, and applies the layup 20 at the desired position 34 (see FIG. 4) on the part surface 22. With the layup 20 applied to and contacting the part surface 22, the pressure source 62 is coupled with lines 75, while the vacuum source 64 remains coupled with line 77. Pressurization of lines 75 result in inflation of the bladder 54, causing the bladder 54 to inflate and apply pressure to the layup 20 which compacts the layup against the part surface 22. During this compaction of the layup 20 by the bladder 54, the bag 56 remains deflated as a result of the vacuum applied through line 77.

Figure 10:
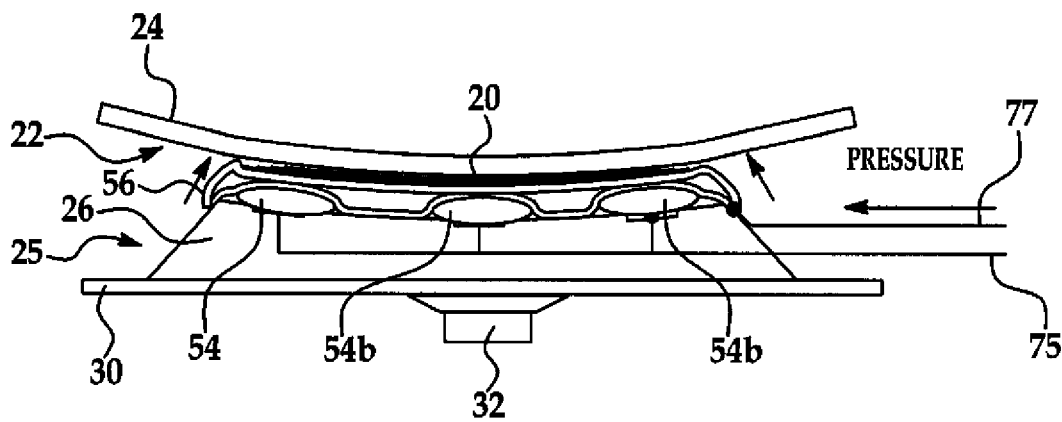
FIG. 10 is an illustration similar to FIG. 9A but showing the bag on the tool having been inflated to further compact the layup against the part surface.

Next, as shown in FIG. 10, the pressure source 62 is coupled with the line 77 which pressurizes and inflates the bag 56, causing it to expand and apply pressure to the layup 20 which further compacts the layup 20 against the part surface 22.

Figure 11:
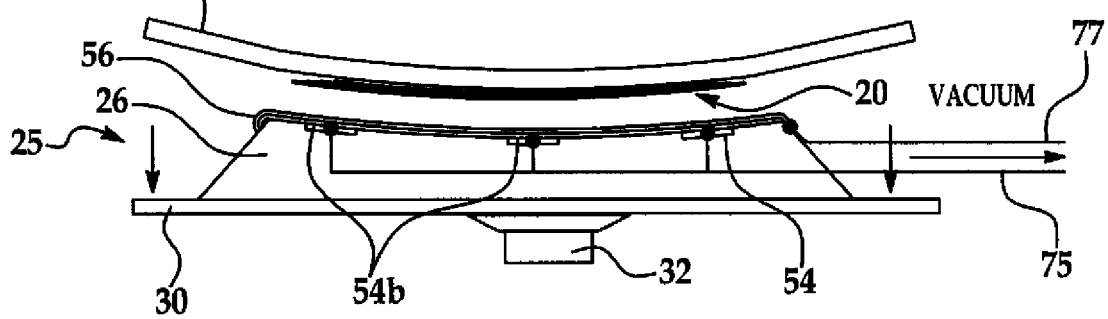
FIG. 11 is an illustration similar to FIG. 10, but showing the bag having been separated from the layup as a result of a vacuum being applied to the bag.

FIG. 11 illustrates the next step in the process in which the vacuum source 64 is coupled with both lines 75 and 77, resulting in deflation of both the bladder 54 and the bag 56. Deflation of bag 56 causes the bag 56 to separate and retract away from the layup 20. Upon separation of the bag 56 from the layup 20, the manipulator 36 returns the tool assembly 25 to a standby position (not shown) in readiness for the next layup/application cycle.

Figure 12:
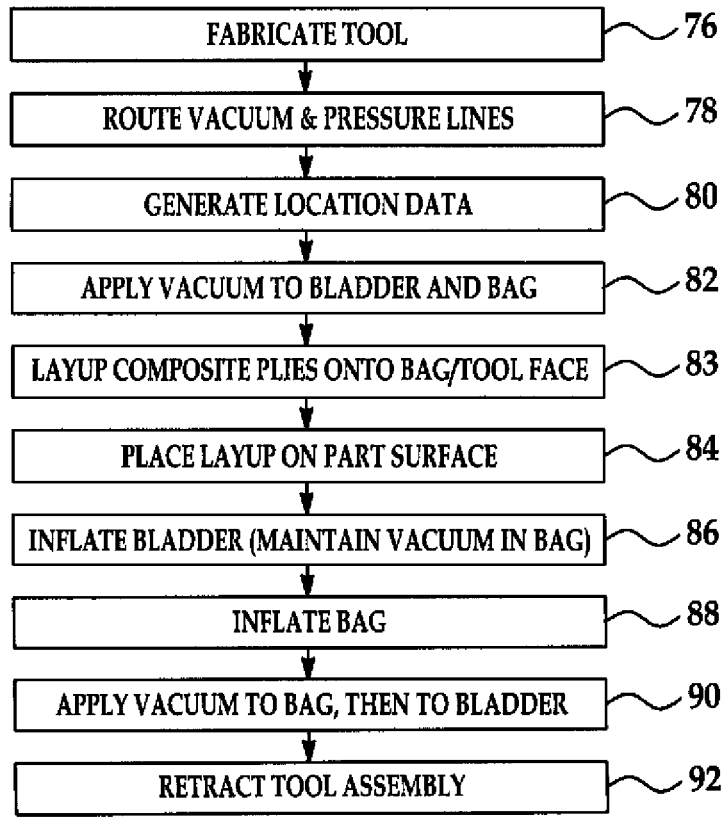
FIG. 12 is an illustration of a flow diagram showing a method of forming and placing layups having complex geometries on a multi-contoured part surface.

Attention is now directed to FIG. 12 which broadly illustrates the steps of a method of forming and applying composite layups to a multi-contoured part surface. Beginning at step 76, a tool 26 is fabricated which, in the illustrated example, may be performed by forming a structural foam into the desired shape having a multi-contoured tool face 28 that substantially matches the multi-contoured surface 22. As previously mentioned, the structural foam may be formed into the desired tool shape using any of various known fabrication processes including but not limited to machining and molding. Next, at step 78, the lines 75, 77 are placed in the tool 26 and coupled with the flow control valves 72. At step 80, a set of location data is generated, using photogrammetry and/or laser tracking techniques previously described, or other techniques, in order to locate the tool face 28 relative to the multi-contoured surface 22. At step 82, vacuum is applied to both the bladder 54 and the bag 56, causing the bag 56 to be drawn down onto the multi-contoured tool face 28. At step 83, a composite layup is formed on the tool face 28 by using the AFP machine 42 to form one or more plies over the bag 56 which conforms to the tool face 28.

With the multi-contoured layup 20 having been formed, then, at step 84, the robot 36 or other manipulator moves the tool assembly 25 into proximity with the part 24, and places the layup 20 onto the part surface 22. Next, as shown at step 86, the bladder 54 is pressurized, causing it to inflate and apply compaction pressure to the layup 20 while the vacuum bag 56 remains deflated. Then, at step 88, the bag 56 is also pressurized, causing it to inflate and apply additional compaction pressure to the layup 20 which further compacts the layup 20 against the part surface 22. Following compaction, vacuum is applied first to the bag 56 and then to the bladder 54, causing each of them to deflate and draw away from the layup 20. In one practical embodiment of the method, the bladder 54 is inflated for one minute while vacuum is applied to the bag 56. Then, the bag 56 is inflated for one minute, following which vacuum is applied to the bag 56 assist in pulling the bag 56 away from the compacted layup 20. Finally, at step 92, the tool assembly 25 is retracted to a standby position, in readiness to repeat the layup formation and placement cycle.

Figure 13:
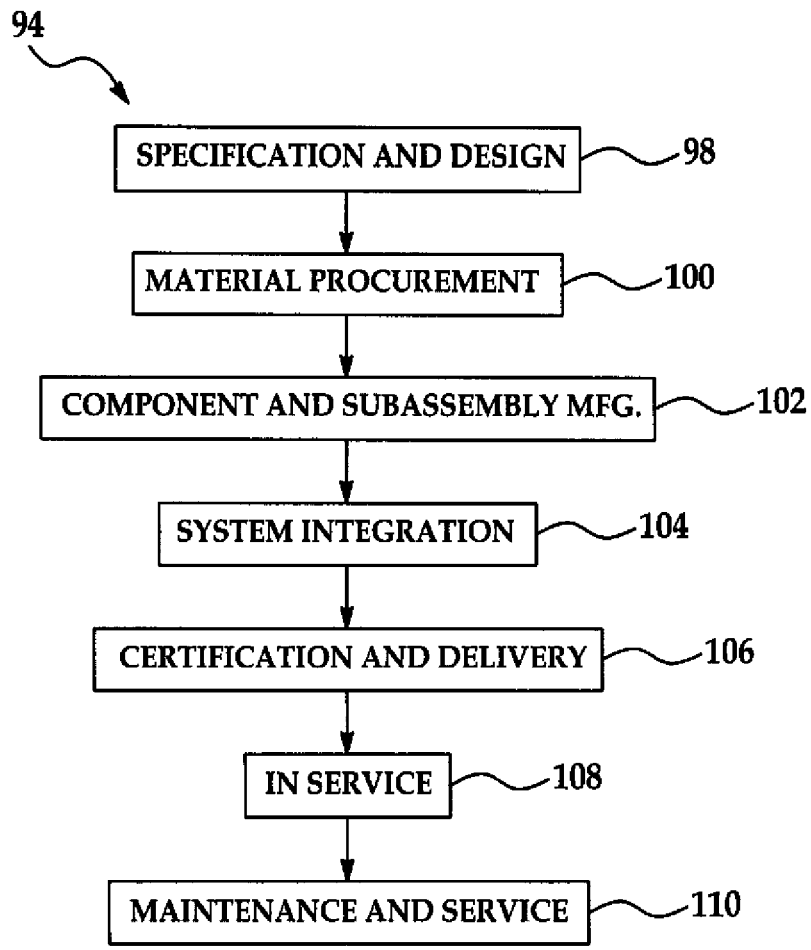
FIG. 13 is an illustration of a flow diagram of aircraft production and service methodology.
Figure 14:
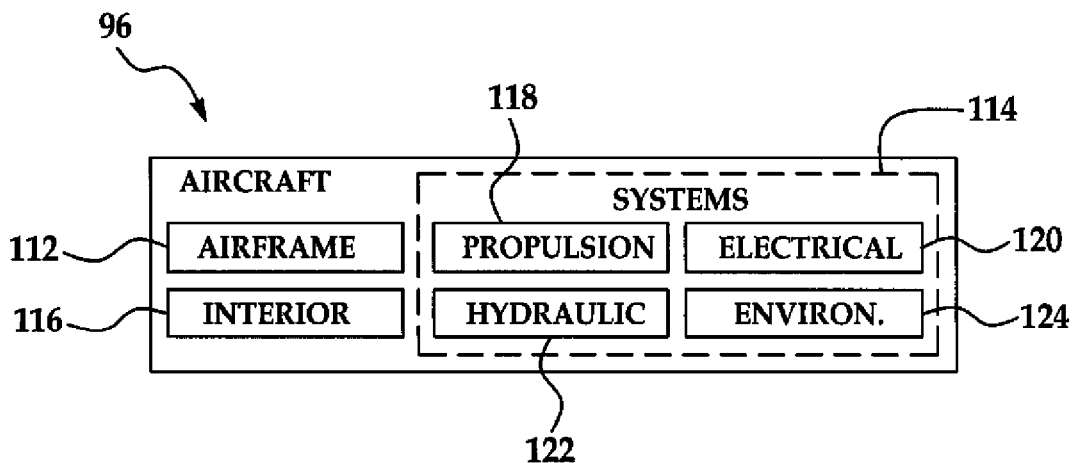
FIG. 14 is an illustration of a block diagram of an aircraft.

Embodiments of the disclosure may find use in a variety of potential applications, particularly in the transportation industry, including for example, aerospace, marine and automotive applications. Thus, referring now to FIGS. 13 and 14, embodiments of the disclosure may be used in the context of an aircraft manufacturing and service method 94 as shown in FIG. 13 and an aircraft 96 as shown in FIG. 14. Aircraft applications of the disclosed embodiments may include, for example, a wide variety of assemblies and subassemblies such as, without limitation, structural members and interior components. During pre-production, exemplary method 94 may include specification and design 98 of the aircraft 96 and material procurement 100. During production, component and subassembly manufacturing 102 and system integration 104 of the aircraft 96 takes place. Thereafter, the aircraft 96 may go through certification and delivery 106 in order to be placed in service 108. While in service by a customer, the aircraft 96 is scheduled for routine maintenance and service 110 (which may also include modification, reconfiguration, refurbishment, and so on).

Each of the processes of method 94 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 14, the aircraft 96 produced by exemplary method 94 may include an airframe 112 with a plurality of systems 114 and an interior 116. Examples of high-level systems 114 include one or more of a propulsion system 118, an electrical system 120, a hydraulic system 122, and an environmental system 124. Any number of other systems may be included. The disclosed method may be employed to fabricate components, structural members, assemblies or subassemblies used in the interior 116 or in the airframe 112. Although an aerospace example is shown, the principles of the disclosure may be applied to other industries, such as the marine and automotive industries.

Systems and methods embodied herein may be employed during any one or more of the stages of the production and service method 94. For example, components, structural members, assemblies or subassemblies corresponding to production process 102 may be fabricated or manufactured in a manner similar to those produced while the aircraft 96 is in service. Also, one or more apparatus embodiments, method embodiments, or a combination thereof may be utilized during the production stages 102 and 104, for example, by substantially expediting assembly of or reducing the cost of an aircraft 96. Similarly, one or more of apparatus embodiments, method embodiments, or a combination thereof may be utilized while the aircraft 96 is in service, for example and without limitation, to maintenance and service 110.

Although the embodiments of this disclosure have been described with respect to certain exemplary embodiments, it is to be understood that the specific embodiments are for purposes of illustration and not limitation, as other variations will occur to those of skill in the art.

What is claimed is:

1. A method of forming a contoured layup and placing the contoured layup on an area of a contoured part, comprising:
   contouring a tool face of the tool to substantially match a first contour of the area of the contoured part;
   deflating a bladder attached to the tool;
   drawing a vacuum between a bag and the tool face so as draw the bag down onto the tool face and to substantially conform to the contour of the tool face, the bladder positioned between the bag and the tool face;
   forming the contoured layup on the flexible bag that covers the tool face and sealed to the tool;
   generating a set of location data representing the location of the part relative to the tool;
   using a manipulator and the location data to move the tool into proximity to the contoured part;
   compacting the contoured layup against the area of the contoured part by inflating a bladder smaller than the tool face while maintaining vacuum between the bag and the tool face; and
   further compacting the contoured layup against the area of the contoured part by inflating the flexible bag.

2. The method of claim 1 wherein forming the contoured layup is performed using an automatic fiber placement machine to automatically place composite material on the tool.

3. The method of claim 1, further comprising:
retracting the flexible bag away from the compacted layup by deflating the flexible bag.

4. The method of claim 1, wherein generating the location data is performed by determining a three-dimensional position of the tool contour relative to a three-dimensional position of the part contour in a three-dimensional reference system.

5. A method of applying a layup on a part surface, wherein the part is multi-contoured, comprising:
contouring a tool face to substantially match a first contour of an area of the part surface;
deflating a plurality of bladders;
drawing a vacuum between a bag and the tool face so as draw the bag down onto the tool face and to substantially conform to the contour of the tool face, the plurality of bladders positioned between the vacuum bag and the tool face;
laying up a plurality of composite plies on the tool face over the vacuum bag to form a layup;
generating a set of location data representing a location of the tool face relative to a surface of the part;
using the location data and a manipulator to automatically move the tool into proximity to the part;
placing the layup against the area of the part surface;
compacting the layup against the area of the part surface by inflating the plurality of bladders between the tool face and the vacuum bag while maintaining vacuum between the bag and the tool face; and
further compacting the layup against the area of the part surface by inflating the vacuum bag while the plurality of bladders are inflated.

6. The method of claim 5, wherein drawing the vacuum bag down onto the tool face is performed by drawing a vacuum in the vacuum bag.

7. The method of claim 5, further comprising:
separating the vacuum bag from the compacted layup by drawing a vacuum within the vacuum bag.

8. A method of applying a layup on a part, wherein the part comprises a multi-contoured part surface, comprising:
contouring a tool face to substantially match a first contour of an area of the part surface;
deflating a shaped bladder;
drawing a vacuum between a flexible bag and the tool face so as to draw the flexible bag down onto the tool face and to substantially conform to the contour of the tool face, the shaped bladder positioned between the vacuum bag and the tool face;
placing a layup on the flexible bag, wherein the layup comprises a plurality of composite plies;
moving the tool into proximity to the part;
using the tool to place the layup on the part surface;
compacting the layup against the part surface by inflating the shaped bladder between the tool face and the flexible bag while maintaining vacuum between the bag and the tool face;
further compacting the layup against the part surface by inflating the flexible bag to create a compacted layup while the shaped bladder is inflated; and
separating the flexible bag from the compacted layup by drawing a vacuum in the flexible bag.

9. The method, of claim 8, wherein:
moving the tool into proximity to the part is performed using a manipulator operated by a controller programmed with a set of data that relate a first position of the part in space to a second position of the tool face.

10. A method of forming a composite doubler and applying the composite doubler to a composite aircraft part having a multi-contoured surface, comprising:
placing a flexible bag over a multi-contoured face of a tool substantially matching first contours of an area of a surface of the composite aircraft part;
sealing the flexible bag to the tool to form a substantially vacuum tight chamber;
deflating a bladder;
drawing the flexible bag down onto the multi-contoured face by drawing a first vacuum in the chamber to substantially conform the flexible bag to the multi-contoured face of the tool, the bladder positioned between the flexible bag and the multi-contoured face;
using an automatic fiber placement machine to form a composite layup on the flexible bag, wherein the composite layup conforms to second contours of the multi-contoured face, and wherein the composite layup further comprises the composite doubler;
mounting the tool on a manipulator that is automatically controlled;
generating a set of location data locating the multi-contoured face relative to the surface in a 3-D spatial reference system;
using the manipulator to move the tool into proximity to the composite aircraft part and place the composite layup on the surface;
inflating the bladder smaller than the multi-contoured face, positioned between the multi-contoured face and the flexible bag, to compact the layup against the surface, while maintaining a vacuum in the flexible bag;
inflating the flexible bag to further compact the layup against the surface while the bladder is inflated; and
deflating the flexible bag by drawing a second vacuum in the bag; and
using a programmed controller to coordinate and control operation of the automatic fiber placement machine, the flexible bag, the bladder, and the manipulator, wherein using the manipulator, inflating the bladder, inflating the flexible bag, and deflating the flexible bag are part of applying the composite doubler to the composite aircraft part.

11. The method of claim 5, wherein inflating the plurality of bladders comprises sequenced inflation to optimize compaction.

12. The method of claim 8, wherein the shaped bladder is shaped to optimize compaction.

13. The method of claim 8, wherein the shaped bladder comprises a plurality of chambers.

14. The method of claim 1, wherein the bladder is at least partially recessed into the tool face.

15. The method of claim 5, wherein a bladder in the plurality of bladders is at least partially recessed into the tool face.

16. The method of claim 8, wherein the shaped bladder is at least partially recessed into the tool face.

17. The method of claim 10, further comprising:
deflating the bladder prior to deflating the flexible bag.

\* \* \* \* \*